(12) United States Patent
Toguchi

(10) Patent No.: US 8,120,697 B2
(45) Date of Patent: Feb. 21, 2012

(54) IMAGING DEVICE AND FOCUSING METHOD

(75) Inventor: Masaaki Toguchi, Toyota (JP)

(73) Assignee: Elmo Company, Limited (JP)

( * ) Notice: Subject to any disclaimer, the term of this patent is extended or adjusted under 35 U.S.C. 154(b) by 151 days.

(21) Appl. No.: 12/748,648

(22) Filed: Mar. 29, 2010

(65) Prior Publication Data
US 2010/0289940 A1    Nov. 18, 2010

(30) Foreign Application Priority Data
May 15, 2009  (JP) .................................. 2009-118675

(51) Int. Cl.
*H04N 5/232*  (2006.01)
(52) U.S. Cl. ...................................................... 348/354
(58) Field of Classification Search .................. 348/345, 348/347, 349, 350, 351, 353, 354, 355, 356
See application file for complete search history.

(56) References Cited

U.S. PATENT DOCUMENTS

| | | | | |
|---|---|---|---|---|
| 5,005,086 A | * | 4/1991 | Iwamoto et al. .............. | 348/356 |
| 5,574,502 A | * | 11/1996 | Haruki ........................... | 348/347 |
| 5,757,429 A | * | 5/1998 | Haruki ........................... | 348/354 |
| 6,879,343 B2 | * | 4/2005 | Yamazaki et al. ............ | 348/351 |

FOREIGN PATENT DOCUMENTS

JP    2008-170507    7/2008

\* cited by examiner

*Primary Examiner* — Nicholas Giles
(74) *Attorney, Agent, or Firm* — Ostrolenk Faber LLP

(57) ABSTRACT

A hill-climbing scheme of an automatic focusing process performed in a digital video camera obtains a moving speed Vj and an AGC gain Gj of a compensator lens every time an AF evaluation value AFj is detected corresponding to the position of the compensator lens. Adjustment factors $\alpha$ and $\beta$ are computed with the moving speed Vj and the AGC gain Gj as parameters, where $0<\alpha<1$ and $0<\beta<1$. The adjustment factor $\alpha$ is set to increase with an increase of the moving speed Vj, while the adjustment factor $\beta$ is set to increase with a decrease of the AGC gain Gj. The automatic focusing process determines an in-focus position, based on the result of comparison between each detected AF evaluation value AFj and a threshold value TH. The threshold value TH is computed by multiplying a maximum value AFmax of the AF evaluation value AFj detected in the course of the hill-climbing scheme by the computed adjustment factors $\alpha$ and $\beta$. This arrangement attains the effective focusing technique of adequately determining the in-focus position according to various imaging conditions.

6 Claims, 6 Drawing Sheets

IMAGING DEVICE AND FOCUSING METHOD

CROSS-REFERENCE TO RELATED APPLICATION

The present application claims priority from Japanese application P2009-118675A filed on May 15, 2009, the content of which is hereby incorporated by reference into this application.

BACKGROUND OF THE INVENTION

1. Field of the Invention

The present invention relates to a focusing technique adopted in an imaging device equipped with an optical system including a focus lens arranged to adjust an in-focus state.

2. Description of the Related Art

The recent advancement of digital techniques has made digital video cameras and diversity of other electronic cameras popular and in widespread use. The electronic camera generally has an automatic focusing mechanism of automatically focusing a focus lens to a subject. One known technique of the automatic focusing mechanism is a hill-climbing scheme (see, for example, JP-A-2008-170507). The hill-climbing scheme of the automatic focusing mechanism shifts the position of a focus lens forward and backward along an optical axis and obtains an evaluation value (hereafter referred to as 'AF evaluation value') by detecting a high-frequency component of a luminance signal generated by an imaging element, such as a CCD, by means of a detection circuit. The hill-climbing scheme of the automatic focusing mechanism determines a position of the focus lens giving a peak of the AF evaluation value as an in-focus position and controls the position of the focus lens to the determined in-focus position (hereafter referred to as 'AF control operation'). The high-frequency component of the luminance signal is used for determination of the in-focus position because of the following reason. An edge of an image taken with an electronic camera generally has a large portion of the high-frequency component. Among images of a subject taken in an identical field, the image with the greater AF evaluation value has the stronger edge or the higher level of the in-focus state.

A relation of the in-focus state according to the position of a focus lens to the AF evaluation value is shown in FIG. 5. As shown in FIG. 5, the AF evaluation value reaches its maximum at the in-focus position and decreases with an increase of the distance away from the in-focus position. The AF evaluation value has no further decrease at positions of the focus lens away from the in-focus position by a preset distance. In a significantly defocused state that is incapable of determining the contents of an image, there is no variation in frequency of the luminance signal. In this state, there is no variation in AF evaluation value. The AF evaluation value with no further variation is called an offset evaluation value AFoff.

The AF control operation is described with reference to FIG. 6. The AF control operation first identifies a moving direction of the focus lens that increases the AF evaluation value by a wobbling technique. The wobbling technique minutely shifts the position of the focus lens and detects a variation of the AF evaluation value in the course of the minute positional shift, so as to identify the moving direction of the focus lens that increases the AF evaluation value to a peak. As shown in FIG. 6, the AF control operation by the wobbling technique starts at a position P1 of the focus lens. A direction going from the position P1 toward a peak (toward a position P3) is identified as the moving direction of the focus lens. The AF control operation then shifts the position of the focus lens by every predetermined distance in the identified moving direction and detects the AF evaluation value at every shifted position. When the AF evaluation value detected at a certain shifted position is greater than the AF evaluation value previously detected, the AF control operation updates a maximum value AFmax of the AF evaluation value.

When the AF evaluation value reaches the peak at the position P3 and then decreases to a threshold value TH, that is, when the focus lens moves to a position P2, the AF control operation determines the position P3 of the focus lens that gives the maximum value AFmax of the AF evaluation value as an in-focus position and moves the focus lens to the determined position P3. The peak position or the position of the focus lens giving a peak of the AF evaluation value is determined only after the AF evaluation value decreases from the maximum value AFmax to the threshold value TH. The video signal generally includes random noise varying with time. This random noise causes a certain variation of the AF evaluation value even when the focus lens is kept at a fixed position. The AF control operation takes into account a potential error induced by such a variation to determine the peak position with high accuracy. The threshold value TH is generally set to a result of subtraction of a preset fixed rate from the maximum value AFmax.

The automatic focusing mechanism, however, has some problems arising in certain imaging conditions. In the case of taking an image of a subject with high contrast, a luminance signal generated by the imaging element includes a large portion of the high-frequency component. A relatively large AF evaluation value is thus detected by the automatic focusing mechanism. In the case of taking an image of a subject with low contrast, on the other hand, a luminance signal generated by the imaging element includes a small portion of the high-frequency component. A relatively small AF evaluation value is thus detected by the automatic focusing mechanism. A high-speed positional shift of the focus lens leads to a greater integral effect of the optical system. This significantly decreases the high-frequency component and thereby gives a relatively small AF evaluation value. A low-speed positional shift of the focus lens, on the other hand, leads to a smaller integral effect of the optical system. This does not significantly decrease the high-frequency component and thereby gives a relatively large AF evaluation value.

Concrete examples of such phenomena are shown in FIGS. 7A and 7B. FIG. 7A shows variations of the AF evaluation value at various moving speeds of the focus lens with respect to a high-contrast subject. FIG. 7B shows variations of the AF evaluation value at the various moving speeds of the focus lens with respect to a low-speed subject. As clearly understood from the comparison between FIG. 7A and FIG. 7B, the low-contrast subject has smaller peak values of the AF evaluation value than the high-contrast subject, because of the difference in integral effect of the optical system explained above. In both of the high-contrast subject and the low-contrast subject, the peak value of the AF evaluation value decreases in the sequence of a low moving speed, a medium moving speed, and a high moving speed of the focus lens.

As shown in FIG. 7A, the high-contrast subject gives relatively large AF evaluation values. Even in the condition of the high moving speed of the focus lens, the threshold value TH calculated by multiplying a maximum value AFmax by a preset rate R ($0<R<1$) is greater than the offset evaluation value AFoff. The peak position is thus always determinable. As shown in FIG. 7B, on the other hand, the low-contrast subject gives relatively small AF evaluation values. In the condition of the high moving speed of the focus lens, the threshold value TH calculated by multiplying a maximum value AFmax by the preset rate R may be smaller than the offset evaluation value AFoff. The peak position may thus be not determinable.

One possible measure to solve the problem may set a large value to the threshold value TH. Setting a large value to the threshold value TH, however, can not sufficiently eliminate the potential effect of noise especially in the state of the low-speed positional shift of the focus lens. This undesirably increases the potential for erroneous determination of the in-focus position. Setting a small value to the threshold value TH lowers the potential for erroneous determination of the in-focus position but increases the moving amount of the focus lens by the AF control operation. This causes a higher vibration degree of the imaging result, which makes the user feel uncomfortable. In general, the threshold value TH is set by taking into account the balance between the accuracy of determination of the in-focus position and the vibration degree of the imaging result. Another possible measure to solve the problem may set a low value to the moving speed of the focus lens with respect to the low-contrast subject. Setting the low value to the moving speed, however, undesirably extends the time required for the AF control operation.

SUMMARY

In order to solve the problem of the prior art, there would be a requirement for a focusing technique of adequately determining the in-focus position according to various imaging conditions.

The present invention accomplishes at least part of the requirement mentioned above and the other relevant requirements by the following configurations and arrangements.

One aspect of the invention is directed to an imaging device equipped with an optical system including a focus lens arranged to adjust an in-focus state. The imaging device has an imaging assembly configured to convert an optical image formed by the optical system into a video signal, and an in-focus evaluation value extraction module configured to adjust the video signal with a preset gain and to detect an in-focus evaluation value by extracting, from the adjusted video signal, at least an intensity of a signal in a certain band including a high-frequency component included in the optical image formed by the optical system. The imaging device also has a maximum value holding module configured to start a positional shift of the focus lens included in the optical system in a direction of increasing the in-focus evaluation value and to keep a maximum value of the in-focus evaluation value detected in the direction of the positional shift, and a criterion threshold setting module configured to set a criterion threshold value to an adjusted value of decreasing the maximum value by a rate determined corresponding to a moving speed of the focus lens on each occasion of detecting the in-focus evaluation value. The imaging device further has an in-focus position determination module configured to compare each detected in-focus evaluation value with the set criterion threshold value and, when the detected in-focus evaluation value is less than the set criterion threshold value, determine a position of the focus lens giving the maximum value of the in-focus evaluation value as an in-focus position.

The imaging device according to this aspect of the invention sets the criterion threshold value to the adjusted value of decreasing the maximum value of the in-focus evaluation value by the rate determined corresponding to the moving speed of the focus lens included in the optical system. Even when a relatively high moving speed of the focus lens gives a relatively small maximum value of the in-focus evaluation value, the imaging device of the invention enables the criterion threshold value to be adequately set for determination of the in-focus position. In the state of a relatively low moving speed of the focus lens, the criterion threshold value is set to the adjusted value of decreasing the maximum value by a different rate corresponding to the low moving speed. The imaging device according to this aspect of the invention thus assures the adequate settings of the criterion threshold value suitable for the low moving speed of the focus lens and suitable for the high moving speed of the focus lens.

In one preferable application of the imaging device according to the above aspect of the invention, the criterion threshold setting module sets the criterion threshold value according to an equation of criterion threshold value=$\alpha \times$maximum value, where $\alpha$ denotes an adjustment factor that increases with an increase in moving speed of the focus lens and satisfies a relation of $\alpha<1$.

The imaging device of this application uses the adjustment factor $\alpha$ for setting the criterion threshold value. The adjustment factor $\alpha$ clearly shows the relation to the maximum value of the in-focus evaluation value. The adjustment factor $\alpha$ is set to increase with an increase of the moving speed of the focus lens and satisfy the relation of $\alpha<1$. When a relatively high moving speed of the focus lens gives a relatively small maximum value of the in-focus evaluation value, the imaging device of this application sets a larger value to the criterion threshold value and thereby assures the effective determination of the in-focus position. In the state of a relatively low moving speed of the focus lens, on the other hand, the imaging device of this application sets a smaller value to the criterion threshold value and thereby prevents the erroneous determination of the in-focus position, for example, due to the generation of noise.

In another preferable application, the imaging device according to the above aspect of the invention further has a learning module configured to learn the in-focus evaluation value detected at a certain position that does give any further variation of the in-focus evaluation value in the direction of the positional shift of the focus lens in a predetermined range, as an offset value. The criterion threshold setting module sets the criterion threshold value according to an equation of criterion threshold value=$\alpha \times$(maximum value−offset value)+offset value, where a denotes an adjustment factor that increases with an increase in moving speed of the focus lens and satisfies a relation of $\alpha<1$.

The imaging device of this application has the similar effects to those of the imaging device of the above application using the adjustment factor $\alpha$ for setting the criterion threshold value. The imaging device of this application additionally takes into account the offset value for setting the criterion threshold value. Even in the condition of a relatively large offset value, this arrangement assures the adequate setting of the criterion threshold value.

In the imaging device of either one of the above applications in accordance with one preferable embodiment of the invention, the criterion threshold setting module corrects the adjustment factor $\alpha$ according to a magnitude of the gain. In the imaging device, the criterion threshold value used for determining the in-focus position is affected by the magnitude of the gain. Correcting the value of the adjustment factor $\alpha$ according to the magnitude of the gain reduces such effect on the criterion threshold value. For example, in the condition of a large gain, a significant level of noise is often generated. Correcting the adjustment factor $\alpha$ to decrease with an increase of the gain desirably eliminates or at least reduces the adverse effect of noise.

In one preferable embodiment of the imaging device according to the above aspect of the invention, the optical system includes a lens unit arranged to adjust a focal length by moving a position of the focus lens included in multiple lenses constituting the optical system, and a moving actuator structured to move the position of the focus lens.

In the imaging device of this embodiment, the position of the focus lens is readily shifted by means of the moving actuator. The moving speed of the focus lens is readily detectable by measuring a control amount of the actuator or by using a sensor provided in the actuator.

Another aspect of the invention is also directed to a focusing method of adjusting a focal point in an imaging device equipped with an optical system including a focus lens arranged to adjust an in-focus state. The focusing method converts an optical image formed by the optical system into a video signal. The focusing method adjusts the video signal with a preset gain and detects an in-focus evaluation value by extracting, from the adjusted video signal, at least an intensity of a signal in a certain band including a high-frequency component included in the optical image formed by the optical system. The focusing method starts a positional shift of the focus lens included in the optical system in a direction of increasing the in-focus evaluation value and keeps a maximum value of the in-focus evaluation value detected in the direction of the positional shift. The focusing method sets a criterion threshold value to an adjusted value of decreasing the maximum value by a rate determined corresponding to a moving speed of the focus lens on each occasion of detecting the in-focus evaluation value. The focusing method compares each detected in-focus evaluation value with the set criterion threshold value and, when the detected in-focus evaluation value is less than the set criterion threshold value, determines a position of the focus lens giving the maximum value of the in-focus evaluation value as an in-focus position. The focusing method starts a positional shift of the focus lens to the determined in-focus position and repeats this sequence of operations in the focusing method.

The focusing method according to this aspect of the invention sets the criterion threshold value to the adjusted value of decreasing the maximum value of the in-focus evaluation value by the rate determined corresponding to the moving speed of the focus lens included in the optical system. Even when a relatively high moving speed of the focus lens gives a relatively small maximum value of the in-focus evaluation value, the focusing method of the invention enables the criterion threshold value to be adequately set for determination of the in-focus position. In the state of a relatively low moving speed of the focus lens, the criterion threshold value is set to the adjusted value of decreasing the maximum value by a different rate corresponding to the low moving speed. The focusing method according to this aspect of the invention thus assures the adequate settings of the criterion threshold value suitable for the low moving speed of the focus lens and suitable for the high moving speed of the focus lens.

The technique of the invention is not restricted to the imaging device or the focusing method discussed above. The principle of the invention may be actualized by diversity of other applications, for example, a focusing program and a storage medium with the focusing program recorded therein.

DESCRIPTION OF THE PREFERRED EMBODIMENTS

Some modes of carrying out the invention are described below with reference to the accompanied drawings.

A. Embodiment

A-1. General Configuration of Digital Video Camera 10

Figure 1:
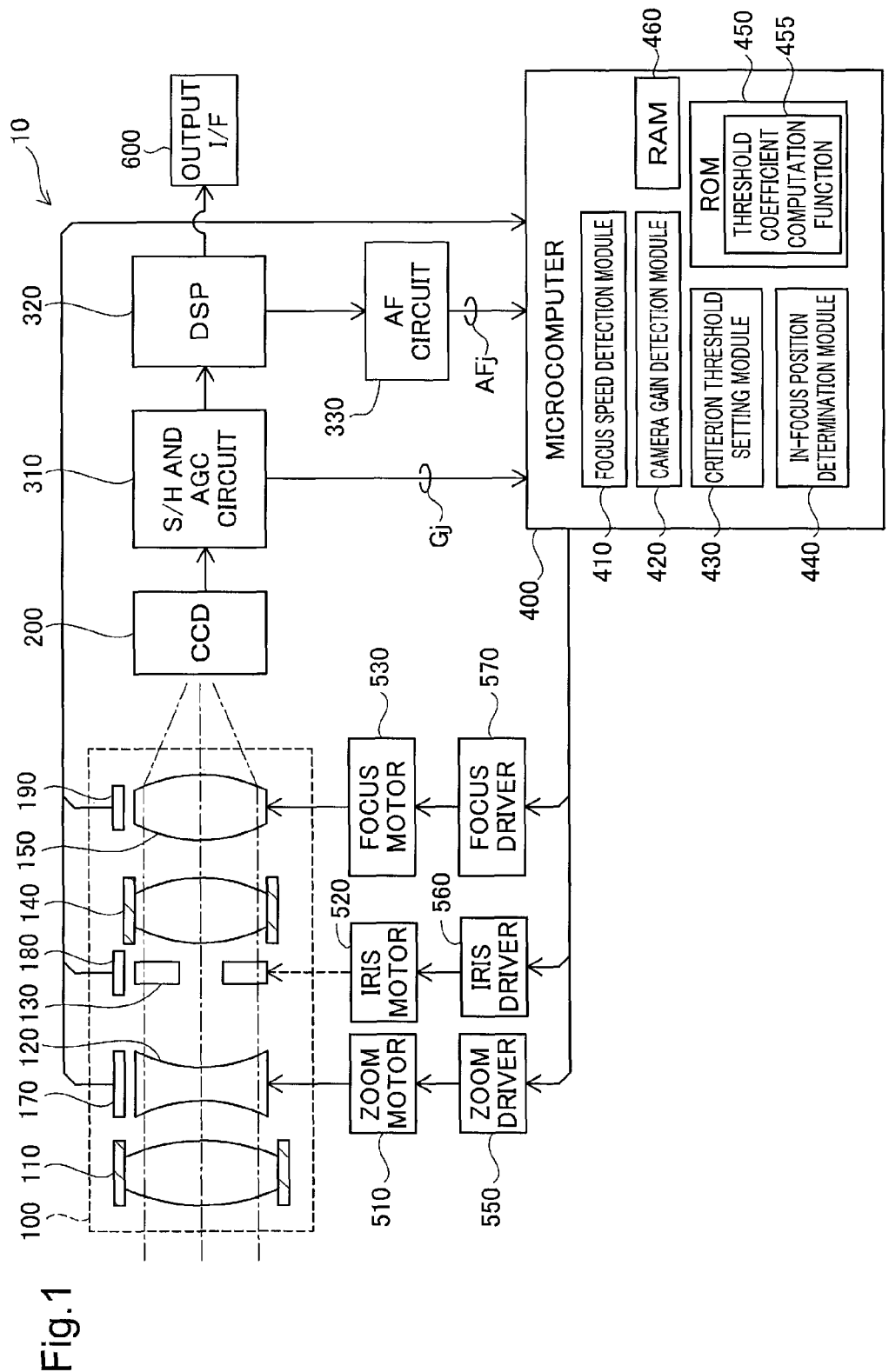
FIG. 1 is an explanatory view illustrating the general configuration of the digital video camera in accordance with one embodiment of the invention.

FIG. 1 is an explanatory view illustrating the general configuration of a digital video camera 10 in accordance with one embodiment of the invention. The digital video camera 10 is configured as a camera for remote meeting systems with a hill-climbing scheme of an automatic focusing mechanism. The digital video camera 10 includes a lens block 100, a CCD 200, a sample hold (S/H) and AGC (automatic gain control) circuit 310, a DSP (digital signal processor) 320, an AF circuit 330, a microcomputer 400, lens-related driving motors 510 through 530, lens-related drivers 550 through 570, and an output interface 600.

The lens block 100 includes a first fixed lens 110, a movable variator lens 120 arranged to have a variable magnification function, an iris 130 designed to control the quantity of light passing through the lenses, a second fixed lens 140, a movable compensator lens 150 arranged to have both a focusing function and a variable magnification-state focal position compensating function, position detectors 170 and 190 respectively structured to detect the position of the variator lens 120 and the position of the compensator lens 150, and an aperture value detector 180 structured to detect an aperture value of the iris 130. The set of these lenses adjusts the magnification, the amount of light, and the focal point of a subject in a field formed by incident light and focuses an optical image with the adjusted parameters on the plane of the CCD 200. For the ease of explanation, each of the lenses mentioned above is shown as a single lens in this embodiment, although each lens may be constructed as a combination of multiple lenses. The compensator lens 150 corresponds to the focus lens in the claims of the invention.

The CCD 200 is an imaging element of converting the focused optical image into electrical signals. The CCD is used as the imaging element in this embodiment, although another imaging element, such as a CMOS, may be used in lieu of the CCD.

The sample hold and AGC circuit 310 extracts signal components from the output of the CCD 200 with removal of switching noise and controls the gain to keep the level of the output signal level constant. The DSP 320 is a processor exclusively used to convert analog signals output from the sample hold and AGC circuit 310 into digital signals, to generate luminance signals and chrominance signals, and to perform a required sequence of processing including gamma correction, aperture correction, and white balance adjustment. The AF circuit 330 detects an AF evaluation value (discussed later) from video signals output from the DSP and includes a high-pass filter, an absolute value circuit, and a detector circuit. The AF evaluation value corresponds to the in-focus evaluation value in the claims of the invention. The AF circuit 330 corresponds to the in-focus evaluation value extraction module in the claims of the invention.

A zoom motor 510 and a focus motor 530 are implemented by stepping motors respectively controlled by a zoom driver 560 and a focus driver 570 to shift the position of the variator lens 120 and the position of the compensator lens 150 and thereby adjust the magnification and the focal point. An iris motor 520 is implemented by a galvanometer controlled by an iris driver 560 to open and close the iris 130 and thereby adjust the amount of light.

The microcomputer 400 loads control programs stored in a ROM 450 to a RAM 460 and executes the control programs to control the operations of the overall digital video camera 10 and to attain the functions of a focus speed detection module 410, a camera gain detection module 420, a criterion threshold setting module 430, and an in-focus position determination module 440. The details of these functions will be described later. In addition to the control programs required for the operations of the overall digital video camera 10 and executed by the microcomputer 400, a threshold coefficient computation function 455 (discussed later) is stored in the ROM 450.

The output interface 600 outputs video data of images taken with the digital video camera 10 to a monitor via a network. Across a network (not shown), the video data of the images taken with the digital video camera 10 can be seen on the screen of a monitor connected to the network.

A-2. Automatic Focusing Process

Figure 2:
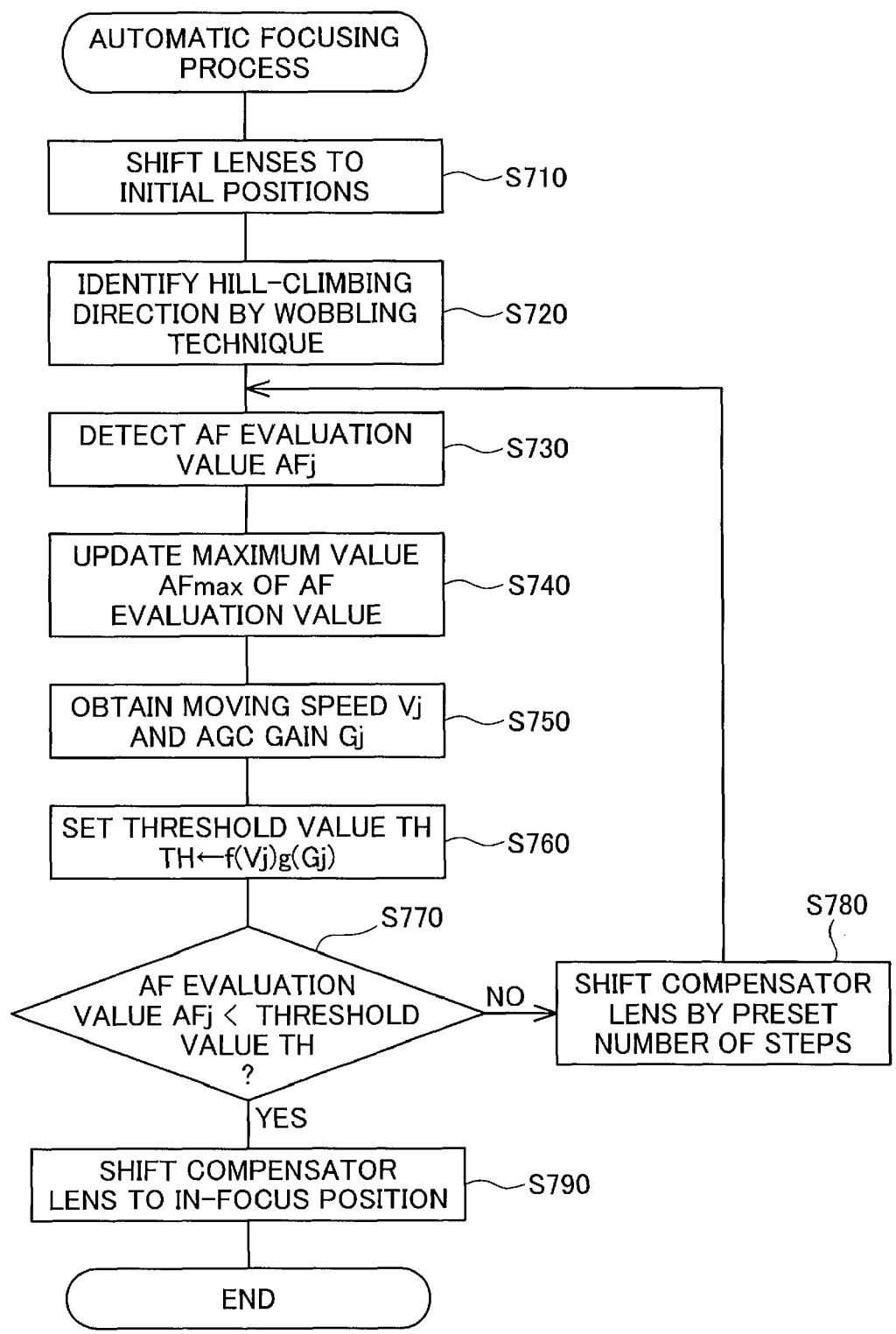
FIG. 2 is a flowchart showing the automatic focusing process performed in the digital video camera of FIG. 1.

FIG. 2 is a flowchart showing an automatic focusing process performed in the digital video camera 10. At a start of the automatic focusing process, the microcomputer 400 shifts the positions of the variator lens 120 and the compensator lens 150 to respective initial positions (step S710). The initial positions herein represent lens positions expected to have the high potential for focusing and have been set in advance by the manufacturer and stored in the ROM 450. In one possible application, preset lens positions adequate for imaging conditions frequently adopted by the user may be stored in a rewritable non-volatile memory. The positions of the variator lens 120 and the compensator lens 150 may be shifted to these preset lens positions at step S710. The processing of step S710 is not necessarily performed in the flow of the automatic focusing process but may be performed prior to a start of the automatic focusing process when the digital video camera 10 is powered on to start imaging. Such modified arrangement speeds up the automatic focusing process.

After shifting the positions of the variator lens 120 and the compensator lens 150, the microcomputer 400 identifies a hill-climbing direction by a wobbling technique (step S720). The wobbling technique detects the AF evaluation value with shifting the position of the compensator lens 150 both in a forward direction and in a backward direction, identifies the moving direction of the compensator lens 150, the forward direction or the backward direction, to give a peak of the AF evaluation value, and detects the identified moving direction of giving the peak of the AF evaluation value as the hill-climbing direction.

After identifying the hill-climbing direction, the microcomputer 400 activates the AF circuit 330 to detect an AF evaluation value $AFj$ at the current position of the compensator lens 150 (step S730). In the AF circuit 330 of this embodiment, the high-pass filter extracts a high frequency component of a luminance signal. The absolute value circuit subsequently computes an absolute value of the extracted high frequency component. A gate circuit extracts only signals within a preset ranging zone. The detector circuit then detects a peak of the extracted signals as the AF evaluation value. The high-pass filter of this embodiment is designed to use a shut-off frequency selectable between two frequencies, 1 MHz and several tens kHz, for meeting the requirements of various fields. This is, however, not restrictive, but the high-pass filter may be designed to use only a single shut-off frequency or to use any other suitable shut-off frequency, in place of the setting of the embodiment. In the configuration of this embodiment, the AF evaluation value is detected, in response to a 60 Hz vertical synchronizing signal.

After detecting the AF evaluation value $AFj$, the microcomputer 400 stores a current maximum value $AFmax$ among all the detected AF evaluation values $AFj$ and a relevant position of the compensator lens 150 giving the maximum value $AFmax$ into the RAM 460 (step S740). On the first occasion of detecting the AF evaluation value $AFj$, the first AF evaluation value $AFj$ and a relevant position of the compensator lens 150 giving the first AF evaluation value $AFj$ are stored as the maximum value $AFmax$ and the relevant position of the compensator lens 150.

After storing the maximum value $AFmax$ and the relevant position of the compensator lens 150, the microcomputer 400 activates the function of the focus speed detection module 410 to obtain a moving speed $Vj$ of the compensator lens 150 at the time of detecting the AF evaluation value $AFj$, while enabling the function of the camera gain detection module 420 to obtain an AGC gain $Gj$ at the time of detecting the AF evaluation value $AFj$ from the sample hold and AGC circuit 310 (step S750). In this embodiment, a control amount of the focus motor 530 by the microcomputer 400 is computed as the moving speed $Vj$. In one modified application, a sensor may be provided in the focus motor 530 to directly measure the moving speed $Vj$.

In the system of this embodiment, the moving speed $Vj$ is controlled on the basis of the AF evaluation value $AFj$ detected at step S730. According to a concrete procedure, when the detected AF evaluation value $AFj$ is close to an offset evaluation value $AFoff$, for example, when a difference between the AF evaluation value $AFj$ and the offset evaluation value $AFoff$ is not greater than a preset reference value, the microcomputer 400 determines that the current position of the compensator lens 150 is relatively away from the in-focus position and controls the moving speed $Vj$ to a relatively higher speed.

When the AF evaluation value $Afj$ is significantly different from the offset evaluation value $AFoff$, for example, when the difference between the AF evaluation value $AFj$ and the offset evaluation value $AFoff$ is greater than the preset reference value, the microcomputer 400 determines that the current position of the compensator lens 150 is relatively close to the in-focus position and controls the moving speed $Vj$ to a relatively lower speed. The offset evaluation value $AFoff$ may be set by the microcomputer 400 at the time of power supply to the digital video camera 10 or prior to a start of the automatic focusing process. By way of example, the offset evaluation value AFoff may be an AF evaluation value detected in a full close condition of the iris 130. In another example, the offset evaluation value AFoff may be an AF evaluation value with a variation of not greater than a preset reference value, which is detected while the position of the compensator lens 150 is shifted in a wide range. In this embodiment, the AGC gain Gj is controlled according to the state of exposure automatically adjusted by the DSP 320.

After obtaining the moving speed Vj and the AGC gain Gj, the microcomputer 400 activates the criterion threshold setting module 430 to set a threshold value TH as a criterion for detecting a peak of the AF evaluation value according to Equation (1) given below (step S760):

$$TH = \alpha \times \beta AFmax \qquad (1)$$

where $\alpha$ and $\beta$ denote adjustment factors satisfying relations of $0<\alpha<1$ and $0<\beta<1$.

Figure 3A:
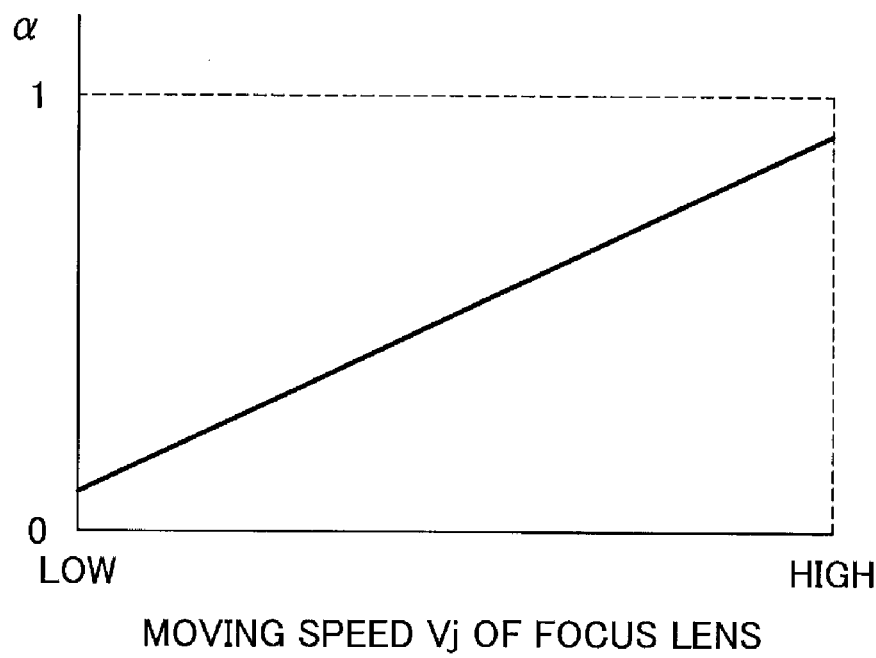
FIG. 3A is an explanatory view showing the variation of the moving speed Vj against the adjustment factor α to set the threshold value TH used in the automatic focusing process.
Figure 3B:
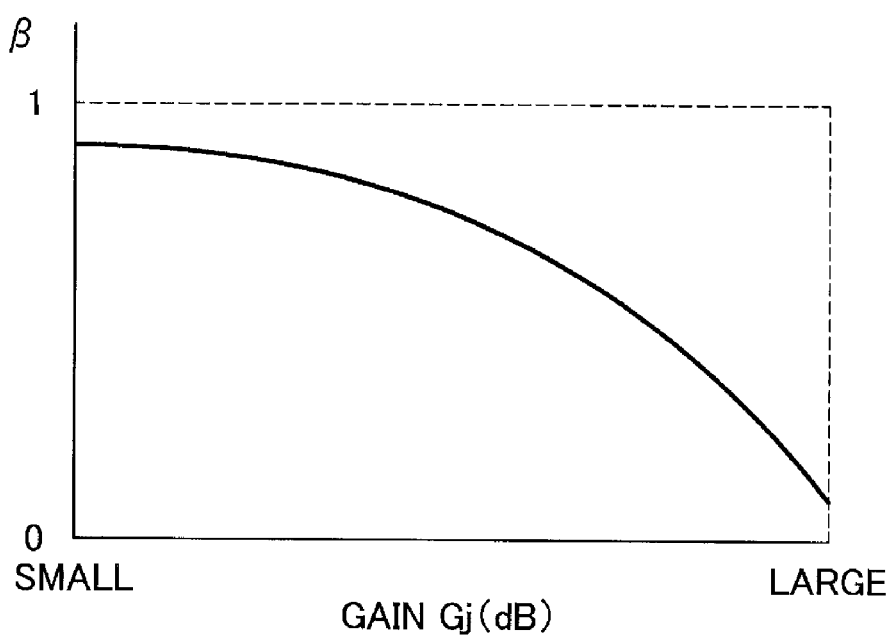
FIG. 3B is an explanatory view showing the variation of the AGC gain Gj against the adjustment factor β to set the threshold value TH used in the automatic focusing process.

The adjustment factors $\alpha$ and $\beta$ are explained concretely. In this embodiment, the adjustment factors $\alpha$ and $\beta$ are used to adjust the variable setting of the threshold value TH. The adjustment factor $\alpha$ and the adjustment factor $\beta$ are respectively computed from the moving speed Vj as the parameter and from the AGC gain Gj as the parameter according to the threshold coefficient computation function 455. A concrete example of the characteristics of the threshold coefficient computation function 455 is shown in FIGS. 3A and 3B. The graph of FIG. 3A shows a variation of the moving speed Vj against the adjustment factor $\alpha$. As shown in this graph, the adjustment factor $\alpha$ is given as a linear function that increases the adjustment factor $\alpha$ with an increase of the moving speed Vj. The graph of FIG. 3B shows a variation of the AGC gain Gj against the adjustment factor $\beta$. As shown in this graph, the adjustment factor $\beta$ is given as a function that increases a decrease rate of the adjustment factor $\beta$ with an increase of the AGC gain Gj.

The characteristics of the threshold coefficient computation function 455 discussed above and shown in the graphs of FIGS. 3A and 3B are only illustrative. The threshold coefficient computation function 455 may be designed to have any characteristics that increase the adjustment factor $\alpha$ with an increase of the moving speed Vj and decrease the adjustment factor $\beta$ with an increase of the AGC gain Gj. In the actual state, the effects of the variation of the moving speed Vj and the variation of the AGC gain Gj on the AF evaluation value AFj depend upon the properties of the camera and the properties of the optical system. It is thus desirable to experimentally specify the optimal characteristics of the threshold coefficient computation function 455, based on the properties of the camera and the properties of the optical system.

Figure 4A:
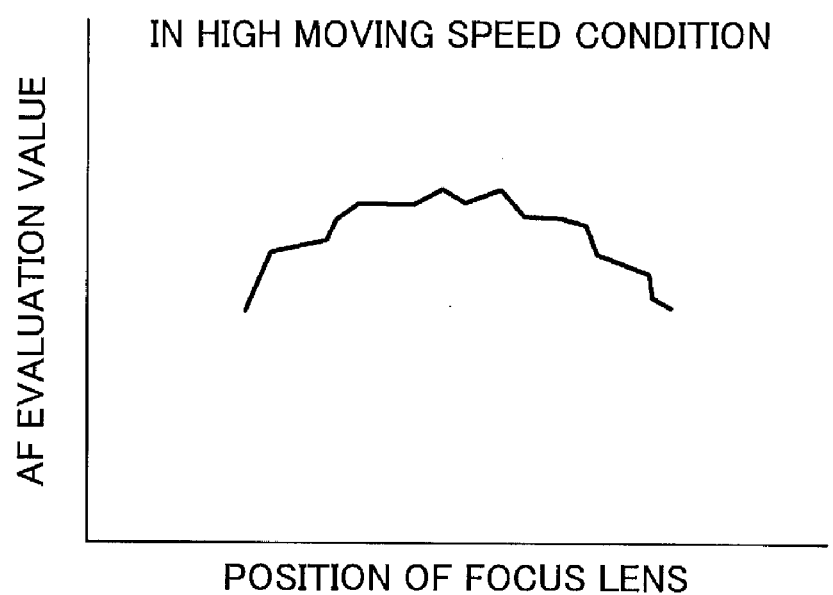
FIGS. 4A and 4B show the difference of noise effects on the AF evaluation value according to the moving speed of the compensator lens.
Figure 4B:
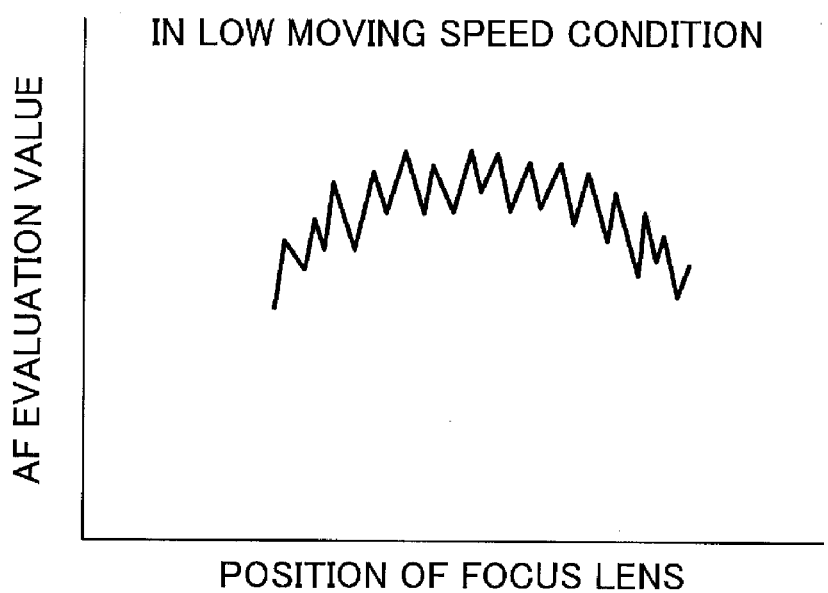
Figure 5:
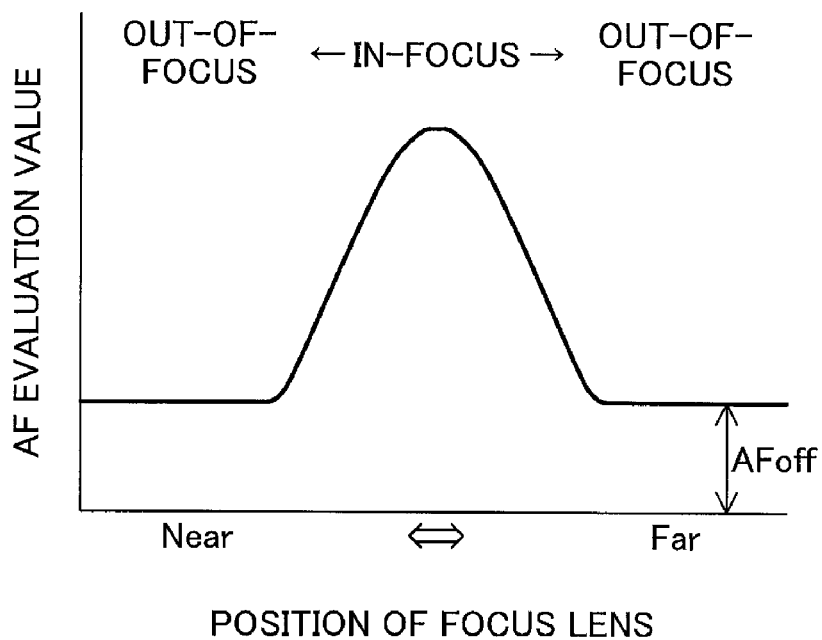
FIG. 5 is an explanatory view showing the relation of the in-focus state according to the position of a focus lens to the AF evaluation value.
Figure 6:
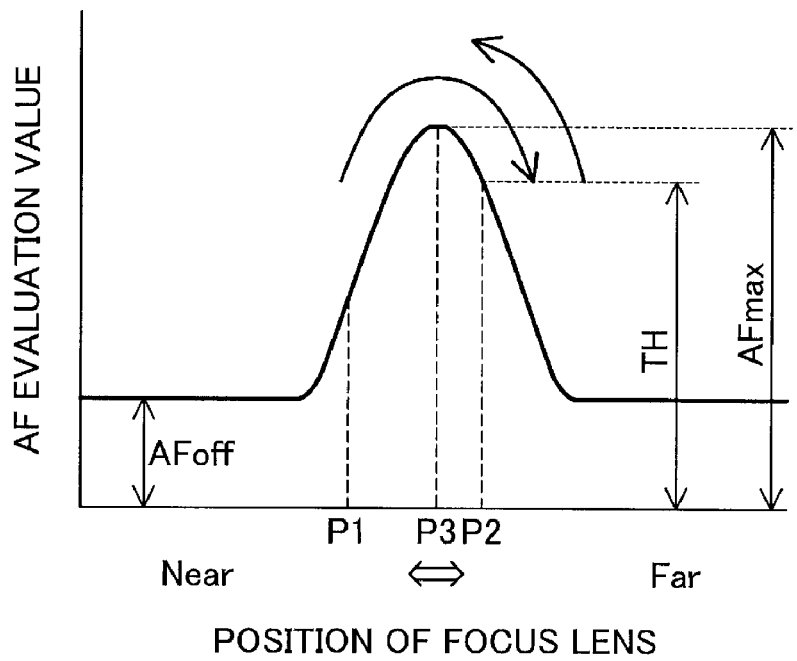
FIG. 6 is an explanatory view showing the hill-climbing scheme of the automatic focusing mechanism.
Figure 7A:
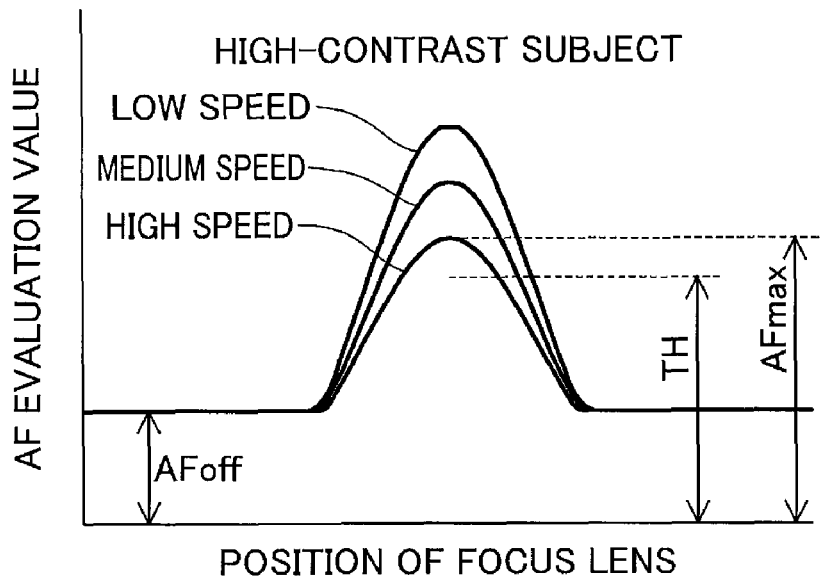
FIGS. 7A and 7B show the effects of the contrast of a subject and of the moving speed of a focus lens on the AF evaluation value.
Figure 7B:
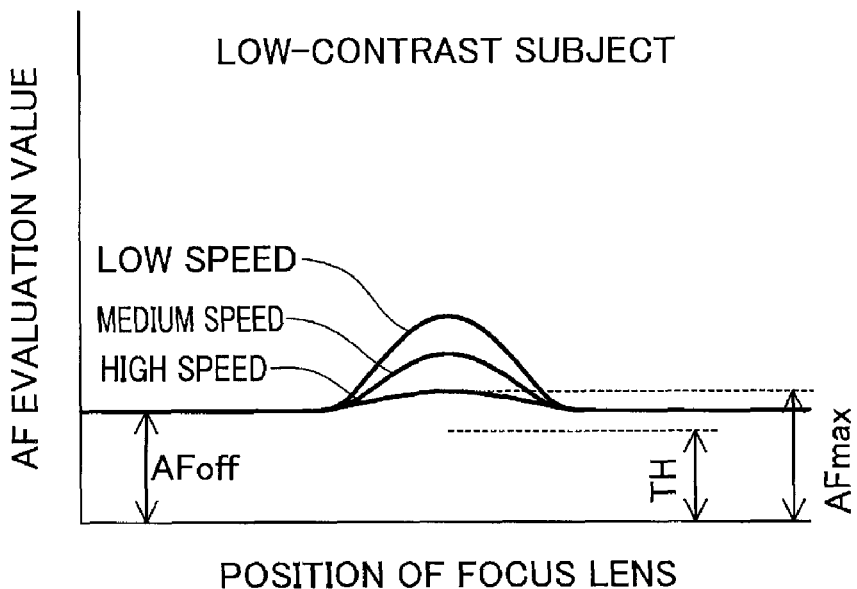

The reason for setting the threshold coefficient computation function 455 as discussed above will be described below. As discussed above with reference to FIGS. 7A and 7B, the AF evaluation value has a relative decrease with a relative increase of the moving speed Vj that is accompanied with an increased integral effect of the optical system, while having a relative increase with a relative decrease of the moving speed Vj. Due to this integral effect, the AF evaluation value has a smaller variation of its magnitude at a relatively high level of the moving speed Vj as shown in the graph of FIG. 4A, while having a greater variation of its magnitude at a relatively low level of the moving speed Vj as shown in the graph of FIG. 4B.

At the relatively high moving speed Vj, the AF evaluation value gives a smaller maximum value AFmax and has a smaller variation of the magnitude. This leads to reduction of random noise. Even when a relatively large value is set to the threshold value TH, the in-focus position is determinable with high accuracy in this state. Setting the relatively large value to the threshold value TH assures the enhanced determination performance of the in-focus position even in the condition of the smaller maximum value AFmax. At the relatively low moving speed Vj, on the other hand, the AF evaluation value gives a greater maximum value AFmax and has a larger variation of the magnitude. This leads to amplification of random noise. Setting a smaller value to the threshold value TH is thus desirable for determination of the in-focus position with high accuracy.

Similarly a relatively small AGC gain Gj leads to reduction of random noise. Even when a relatively large value is set to the threshold value TH, the in-focus position is determinable with high accuracy in this state. A relatively large AGC gain Gj, on the other hand, leads to amplification of random noise. Setting a smaller value to the threshold value TH is thus desirable for determination of the in-focus position with high accuracy.

After setting the threshold value TH, the microcomputer 400 activates the in-focus position determination module 440 to determine whether the AF evaluation value AFj detected at the current position of the compensator lens 150 at step S730 is less than the set threshold value TH (step S770). When the AF evaluation value AFj is less than the set threshold value TH (step S770: Yes), the microcomputer 400 activates the in-focus position determination module 440 to determine the position of the compensator lens 150 giving the maximum value AFmax stored in the RAM 460 as an in-focus position, reads the determined in-focus position, and gives a command to the focus motor 530 via the focus driver 570 to shift the compensator lens 150 to the determined in-focus position (step S790). The flow of the automatic focusing process is then terminated.

When the AF evaluation value AFj is not less than the set threshold value TH (step S770: No), on the contrary, the microcomputer 400 shifts the compensator lens 150 by preset number of steps in the identified hill-climbing direction (step S780). The flow of the automatic focusing process then returns to step S730 and repeats the above sequence of processing until the AF evaluation value AFj becomes less than the set threshold value TH at step S770.

In the digital video camera 10 of the embodiment having the configuration discussed above, the threshold value TH is set to an adjusted value of decreasing the maximum value AFmax by a rate corresponding to the adjustment factor $\alpha$ varied against the moving speed Vj. In the state of a relatively high moving speed Vj that gives a smaller maximum value AFmax, a relatively large value is set to the threshold value TH. Such setting prevents the threshold value TH from becoming smaller than the offset evaluation value AFoff and thereby improves the determination performance of the in-focus position. The relatively high moving speed Vj leads to reduction of random noise. Even when a relatively large value is set to the threshold value TH, the in-focus position is determinable with high accuracy in this state. The relatively high moving speed Vj is allowed for even a subject of low contrast. This arrangement desirably shortens the time required for the automatic focusing process. In the state of a relatively low moving speed Vj, on the other hand, setting a relatively small value to the threshold value TH enables the in-focus position to be determined at high speed and with high accuracy.

In the digital video camera 10 of the embodiment, the AF evaluation value AFj is affected by the magnitude of the AGC gain Gj. The adjustment factor $\alpha$ is corrected with the adjustment factor $\beta$ varied against the AGC gain Gj. Such correction effectively compensates for the possible effect of the AGC gain Gj on the AF evaluation value AFj. For example, a relatively large AGC gain Gj tends to increase random noise. The adjustment factor α is thus corrected with the adjustment factor β to decrease with an increase of the AGC gain Gj. Such correction desirably reduces the potential effect of random noise.

The digital video camera 10 of the embodiment enables the threshold value TH to be adequately controlled without requiring addition of any particular circuit. Namely the adequate control of the threshold value TH is attainable without complication of the system configuration or increase of the manufacturing cost.

B. Modifications

Some modifications of the embodiment are described below.

B-1. Modification 1

In the configuration of the embodiment discussed above, the adjustment factor α varied against the moving speed Vj and the adjustment factor β varied against the AGC gain Gj are computed according to the threshold coefficient computation function 455. The computation of the respective adjustment factors α and β are, however, not restricted to the method using such a function. One modified application may prepare and store in advance a table of correlating the adjustment factors α and β to the moving speed Vj and the AGC gain Gj in the ROM 450. In this modified application, the microcomputer 400 may refer to the stored table and set the adjustment factors α and β corresponding to the obtained moving speed Vj and the obtained AGC gain Gj.

By way of example, the table may be designed to correlate the adjustment factors α and β to varying values of the moving speed Vj and the AGC gain Gj divided into multiple value ranges. In another example, the table may be designed to correlate the adjustment factors α and β to representative values of the moving speed Vj and the AGC gain Gj. In the latter example, interpolation based on the representative values may be performed with regard to non-representative values of the moving speed Vj and the AGC gain Gj. Such interpolation specifies the adjustment factors α and β corresponding to the non-representative values. The table may be provided as a one-dimensional table of individually correlating the adjustment factor α to the moving speed Vj and correlating the adjustment factor β to the AGC gain Gj. Alternatively the table may be provided as a two-dimensional table of correlating an adjustment factor γ(=α×β) to the moving speed Vj and the AGC gain Gj. Setting the adjustment factors α and β according to the table desirably increases the processing speed.

B-2. Modification 2

In the configuration of the embodiment discussed above, the threshold value TH is set with the moving speed Vj and the AGC gain Gj as the parameters. In general, the threshold value TH may be set with at least the moving speed Vj as the parameter. For example, when the high-speed processing is required, when the value of the AGC gain is fixed by manual setting, or when a variation in magnitude of noise induced by a variation of the AGC gain is negligible, the threshold value TH may be set with only the moving speed Vj as the parameter according to Equation (2) given below:

$$TH = \alpha \times AF\text{max} \quad (2)$$

B-3. Modification 3

In the configuration of the embodiment discussed above, the threshold value TH is set according to Equation (1) discussed above and shown below:

$$TH = \alpha \times \beta \times AF\text{max} \quad (1)$$

The equation used for setting the threshold value TH is not restricted to Equation (1). Any equation may be used to dynamically set the threshold value TH with the adjustment factor α varied against at least the moving speed Vj. For example, the threshold value TH may be set according to Equation (3) or Equation (4) given below:

$$TH = \alpha \times \beta \times (AF\text{max} - AF\text{off}) + AF\text{off} \quad (3)$$

$$TH = \alpha \times (AF\text{max} - AF\text{off}) + AF\text{off} \quad (4)$$

where α and β denote adjustment factors computed in the same manner as discussed above.

Setting the threshold value TH according to either of these modified equations assures the similar effects to those of the embodiment discussed above. In this modified application, the threshold value TH is set by taking into account the offset evaluation value AFoff. More specifically, the threshold value TH is set to be always greater than the offset evaluation value AFoff. This arrangement assures the effective determination of the in-focus position, when the high moving speed Vj is set for a subject of low contrast or when the offset evaluation value AFoff is relatively large.

B-4. Modification 4

The automatic focusing process of the embodiment updates the setting of the threshold value TH at step S760 every time the AF evaluation value AFj is detected at step S730. One modified flow of the automatic focusing process may determine whether the update setting of the threshold value TH is required according to the values of the moving speed Vj and the AGC gain Gj obtained at step S750. For example, when the current values of the moving speed Vj and the AGC gain Gj obtained at step S750 in a current cycle of the automatic focusing process are substantially equal to or have only slight differences within preset value ranges from the previous values of the moving speed Vj and the AGC gain Gj obtained at step S750 in a previous cycle, the update setting of the threshold value TH may be omitted. In this case, the threshold value TH set at step S760 in the previous cycle may be used for the determination of the in-focus position at step S770. This arrangement desirably prevents the unnecessary update setting of the threshold value TH when the threshold value TH has only a slight variation that does not significantly affect the determination result of the in-focus position, thus increasing the overall processing speed.

Among the various components of the invention included in the configuration of the embodiment discussed above, the components other than those disclosed in independent claims are additional components and may be omitted according to the requirements. The embodiment and its modified applications discussed above are to be considered in all aspects as illustrative and not restrictive. There may be many modifications, changes, and alterations without departing from the scope or spirit of the main characteristics of the present invention. The embodiment describes the digital video camera configured to shift the position of the compensator lens 150 for automatic focusing control. The technique of the invention is similarly applicable to a digital video camera configured to shift the position of the CCD 200 for automatic focusing control or to a digital video camera configured to vary the shape of the second fixed lens 140 by application of a voltage for automatic focusing control. The principle of the invention may be actualized by diversity of imaging devices other than the digital video camera designed for remote meeting systems, for example, digital video cameras for monitoring purposes, digital video cameras for various business purposes,

What is claimed is:

1. An imaging device equipped with an optical system including a focus lens arranged to adjust an in-focus state, the imaging device comprising:
- an imaging assembly configured to convert an optical image formed by the optical system into a video signal;
- an in-focus evaluation value extraction module configured to adjust the video signal with a preset gain and to detect an in-focus evaluation value by extracting, from the adjusted video signal, at least an intensity of a signal in a certain band including a high-frequency component included in the optical image formed by the optical system;
- a maximum value holding module configured to start a positional shift of the focus lens included in the optical system in a direction of increasing the in-focus evaluation value and to keep a maximum value of the in-focus evaluation value detected in the direction of the positional shift;
- a criterion threshold setting module configured to set a criterion threshold value to an adjusted value of decreasing the maximum value by a rate determined corresponding to a moving speed of the focus lens on each occasion of detecting the in-focus evaluation value; and
- an in-focus position determination module configured to compare each detected in-focus evaluation value with the set criterion threshold value and, when the detected in-focus evaluation value is less than the set criterion threshold value, determine a position of the focus lens giving the maximum value of the in-focus evaluation value as an in-focus position.

2. The imaging device in accordance with claim 1, wherein the criterion threshold setting module sets the criterion threshold value according to an equation of:

$$\text{criterion threshold value} = \alpha \times \text{maximum value}$$

where $\alpha$ denotes an adjustment factor that increases with an increase in moving speed of the focus lens and satisfies a relation of $\alpha < 1$.

3. The imaging device in accordance with claim 1, the imaging device further having:
- a learning module configured to learn the in-focus evaluation value detected at a certain position that keeps the in-focus evaluation value in the direction of the positional shift of the focus lens in a predetermined range, as an offset value, wherein the criterion threshold setting module sets the criterion threshold value according to an equation of:

$$\text{criterion threshold value} = \alpha \times (\text{maximum value} - \text{offset value}) + \text{offset value}$$

where $\alpha$ denotes an adjustment factor that increases with an increase in moving speed of the focus lens and satisfies a relation of $\alpha < 1$.

4. The imaging device in accordance with claim 2, wherein the criterion threshold setting module corrects the adjustment factor $\alpha$ according to a magnitude of the gain.

5. The imaging device in accordance with claim 1, wherein the optical system includes:
- a lens unit arranged to adjust a focal length by moving a position of the focus lens included in multiple lenses constituting the optical system; and
- a moving actuator structured to move the position of the focus lens.

6. A focusing method of adjusting a focal point in an imaging device equipped with an optical system including a focus lens arranged to adjust an in-focus state, the focusing method comprising:
- converting an optical image formed by the optical system into a video signal;
- adjusting the video signal with a preset gain and detecting an in-focus evaluation value by extracting, from the adjusted video signal, at least an intensity of a signal in a certain band including a high-frequency component included in the optical image formed by the optical system;
- starting a positional shift of the focus lens included in the optical system in a direction of increasing the in-focus evaluation value and keeping a maximum value of the in-focus evaluation value detected in the direction of the positional shift;
- setting a criterion threshold value to an adjusted value of decreasing the maximum value by a rate determined corresponding to a moving speed of the focus lens on each occasion of detecting the in-focus evaluation value;
- comparing each detected in-focus evaluation value with the set criterion threshold value and, when the detected in-focus evaluation value is less than the set criterion threshold value, determining a position of the focus lens giving the maximum value of the in-focus evaluation value as an in-focus position; and
- starting a positional shift of the focus lens to the determined in-focus position and repeating this sequence of operations in the focusing method.

* * * * *